(12) United States Patent
Park et al.

(10) Patent No.: US 9,111,650 B2
(45) Date of Patent: Aug. 18, 2015

(54) ZIRCONIUM ALLOYS FOR A NUCLEAR FUEL CLADDING HAVING A SUPERIOR OXIDATION RESISTANCE IN A SEVERE REACTOR OPERATION CONDITION AND METHODS OF PREPARING A ZIRCONIUM ALLOY NUCLEAR CLADDING BY USING THEREOF

(71) Applicants: KOREA ATOMIC ENERGY RESEARCH INSTITUTE, Daejeon (KR); KOREA HYDRO AND NUCLEAR POWER CO., LTD., Gyeongsangbuk-do (KR)

(72) Inventors: Jeong-Yong Park, Daejeon (KR); Yang-Il Jung, Daejeon (KR); Hyun Gil Kim, Daejeon (KR); Byoung-Kwon Choi, Daejeon (KR); Sang Yoon Park, Daejeon (KR); Dong Jun Park, Daejeon (KR); Yang-Hyun Koo, Daejeon (KR)

(73) Assignees: Korea Atomic Energy Research Institute, Daejeon (KR); Korea Hydro and Nuclear Power Co., Ltd., Gyeongsangbuk-do (KR)

( * ) Notice: Subject to any disclaimer, the term of this patent is extended or adjusted under 35 U.S.C. 154(b) by 454 days.

(21) Appl. No.: 13/747,763

(22) Filed: Jan. 23, 2013

(65) Prior Publication Data

US 2013/0220495 A1 Aug. 29, 2013

(30) Foreign Application Priority Data

Feb. 28, 2012 (KR) .......................... 10-2012-0020275

(51) Int. Cl.
*G21C 3/07* (2006.01)
*C22C 16/00* (2006.01)
*G21C 21/10* (2006.01)
*C22F 1/18* (2006.01)

(52) U.S. Cl.
CPC . *G21C 3/07* (2013.01); *C22C 16/00* (2013.01); *C22F 1/186* (2013.01); *G21C 21/10* (2013.01); *Y02E 30/40* (2013.01)

(58) Field of Classification Search
CPC .............. C22F 1/186; C22F 1/00; C22F 1/02; C22C 16/00; C22C 38/12; B22D 7/00
USPC ......................................................... 148/557
See application file for complete search history.

(56) References Cited

U.S. PATENT DOCUMENTS

| 4,649,023 | A | 3/1987 | Sabol et al. |
| 5,844,959 | A | 12/1998 | Van Swam et al. |
| 6,125,161 | A | 9/2000 | Isobe et al. |
| 2010/0108204 | A1* | 5/2010 | Park et al. ..................... 148/557 |

FOREIGN PATENT DOCUMENTS

| JP | 08-067954 A | 3/1996 |
| KR | 20020062052 | 7/2002 |
| KR | 20030037137 | 5/2003 |
| KR | 20060122823 A | 11/2006 |
| KR | 20090079866 A | 7/2009 |
| KR | 20090092489 A | 9/2009 |
| KR | 20090117414 A | 11/2009 |

* cited by examiner

*Primary Examiner* — Khanh P Nguyen
*Assistant Examiner* — Timmy Long
(74) *Attorney, Agent, or Firm* — Sheridan Ross P.C.

(57) ABSTRACT

Disclosed are a zirconium alloy for a nuclear fuel cladding having a good oxidation resistance in a severe reactor operation condition and a method of preparing zirconium alloy nuclear fuel claddings by using thereof. The zirconium alloy includes 1.8 to 2.0 wt % of niobium (Nb); at least one element selected from iron (Fe), chromium (Cr) and copper (Cu); 0.1 to 0.15 wt % of oxygen (O); 0.008 to 0.012 wt % of silicon (Si) and a remaining amount of zirconium (Zr). The amount of Fe is 0.1 to 0.4 wt %, the amount of Cr is 0.05 to 0.2 wt %, and the amount of Cu is 0.03 to 0.2 wt %. A good oxidation resistance of the nuclear fuel cladding may be confirmed under a severe reactor operation condition at an accident condition as well as a normal operating condition of a reactor, thereby improving economic efficiency and safety.

9 Claims, 2 Drawing Sheets

ZIRCONIUM ALLOYS FOR A NUCLEAR FUEL CLADDING HAVING A SUPERIOR OXIDATION RESISTANCE IN A SEVERE REACTOR OPERATION CONDITION AND METHODS OF PREPARING A ZIRCONIUM ALLOY NUCLEAR CLADDING BY USING THEREOF

CROSS-REFERENCES TO RELATED APPLICATION

This patent application claims the benefit of priority from Korean Patent Application No. 10-2012-20275, filed on Feb. 28, 2012, the contents of which are incorporated herein by reference.

BACKGROUND OF THE INVENTION

1. Field of the Invention

The present disclosure relates to zirconium alloys for a nuclear fuel cladding having a superior oxidation resistance in a severe reactor operation condition and methods of preparing a zirconium alloy nuclear fuel cladding by using thereof; and more particularly, to zirconium alloys for a nuclear fuel cladding having a superior oxidation resistance and applicable for a power uprate, a load follow, an ultra high burnup and an ultra long cycle operation, and methods of preparing a zirconium alloy nuclear fuel cladding by using thereof.

2. Description of the Related Art

As nuclear fuel used in a nuclear power plant for power production in operation, a zirconium alloy for a nuclear fuel cladding is used. Nowadays, a zirconium alloy such as Zircaloy-4, Zircaloy-2, ZIRLO, M5, etc. is used as the nuclear fuel cladding. However, Zircaloy-4 commonly used as the nuclear fuel cladding in a power plant from 1960s are recently replaced with a novel alloy such as ZIRLO, M5, etc. The novel alloy including ZIRLO and M5 has a good corrosion resistance in a normally operating reactor when comparing with the commonly used Zircaloy-4 and contributes to the improvement of the performance of the nuclear fuel. Through the improvement of the corrosion resistance of the nuclear fuel cladding, the nuclear fuel may be used safely for an extended time period, thereby improving the economic efficiency of a nuclear power generation.

The improvement of the corrosion resistance, which is the most important characteristic of the nuclear fuel cladding under development, may be accomplished by appropriately combining alloying elements along with a manufacturing method. Particularly, the corrosion resistance of the nuclear fuel cladding may be remarkably increased by using niobium (Nb) as a main element among the alloy elements of the zirconium alloy, when comparing with Zircaloy-4 alloy. However, the zirconium alloy including the niobium may have quite different phase transition properties from Zircaloy-4 alloy. Thus, the development on a manufacturing technology according to the change of the alloy elements is also necessary at the same time.

Technology on improving the corrosion resistance of the zirconium alloy through the adjustment of the alloy elements and the control of a heat treatment are disclosed as follows.

U.S. Pat. No. 6,125,161A discloses a method of preparing a zirconium alloy nuclear fuel cladding including 0.2 to 1.7 wt % of tin, 0.18 to 0.6 wt % of iron, 0.07 to 0.4 wt % of chromium and 0.05 to 1.0 wt % of niobium.

JP 8067954A discloses a method of preparing a zirconium alloy nuclear fuel cladding including 0.4 to 1.7 wt % of tin, 0.25 to 0.75 wt % of iron, 0.05 to 0.3 wt % of chromium, 0 to 0.1 wt % of nickel and 0 to 1.0 wt % of niobium.

U.S. Pat. No. 4,649,023A discloses a method of preparing a zirconium alloy including 0.5 to 2.0 wt % of niobium, 0 to 1.5 wt % of tin, and 0.25 wt % of at least one element selected from the group consisting of iron, chromium, molybdenum, vanadium, copper, nickel, and tungsten.

U.S. Pat. No. 5,844,959A discloses a zirconium alloy for a nuclear fuel cladding including 0.5 to 3.25 wt % of niobium and 0.3 to 1.8 wt % of tin.

Operating conditions of a reactor have been continuously changed to a direction of increasing the economic efficiency of a nuclear power generation. As the operating conditions for increasing the economic efficiency of the nuclear power generation, a power uprate, a load follow, an ultra high burnup, an ultra long cycle operation, etc. have been known. Under such operating conditions, even the recently used novel alloy claddings in place of Zircaloy-4 may be expected to hardly maintain integrity for a long time. Accordingly, the development on the cladding maintaining a good performance under severe operating conditions may be an essential factor of the improvement of the economic efficiency in a nuclear power generation.

In addition, among the necessary performance of the cladding, safety under an emergency condition in the event of an accident becomes important more and more.

When a cooling function of a nuclear reactor is malfunctioning in an accident due to a natural disaster such as an earthquake, tsunami, etc. or by a man made hazard, the cladding may be exposed to a high temperature and may be rapidly oxidized, thereby generating hydrogen having a risk of an explosion. The hydrogen explosion generated in a power plant is required to be prevented without fail because the explosion may induce a disaster accompanying the leakage of radioactive substances. Thus, the nuclear fuel cladding is required to have a good oxidation resistance at a high temperature even when exposed to an accident condition. When the nuclear fuel cladding has a good oxidation resistance at a high temperature even in an accident, time for managing may be increased before the hydrogen explosion, and the safety of the nuclear power generation may be remarkably improved. However, the development on the nuclear fuel cladding until now has been conducted for mainly improving the economic efficiency under a normal operation without considering the safety in an accident condition greatly. Thus, the preparation on confirming the safety in an accident condition is urgently in need.

Accordingly, the present inventors have studied on a zirconium alloy nuclear fuel cladding by which the economic efficiency of the nuclear power generation may be increased and the safety in an accident condition also may be improved, and have developed a zirconium alloy having a good oxidation resistance under a normal operating condition of a reactor as well as under accident condition and applicable for a power uprate, a load follow, an ultra high burnup and an ultra long cycle operation.

SUMMARY OF THE INVENTION

One object of the present invention is to provide a zirconium alloy for a nuclear fuel cladding having a good oxidation resistance in a severe reactor operation condition, and a method of preparing a zirconium alloy nuclear fuel cladding by using thereof.

In order to achieve the objects, the present invention provides a zirconium alloy for a nuclear fuel cladding including 1.8 to 2.0 wt % of niobium (Nb); at least one element selected from the group consisting of iron (Fe), chromium (Cr) and copper (Cu); 0.1 to 0.15 wt % of oxygen (O); 0.008 to 0.012 wt % of silicon (Si) and a remaining amount of zirconium (Zr), in which, an amount of the iron (Fe) is 0.1 to 0.4 wt %, an amount of the chromium (Cr) is 0.05 to 0.2 wt %, and an amount of the copper (Cu) is 0.03 to 0.2 wt %.

The present invention also provides a method of preparing a zirconium alloy nuclear fuel cladding including:

manufacturing an ingot by vacuum arc remelting and then cooling the zirconium alloy for the nuclear fuel cladding (Step 1);

forging thus manufactured ingot in Step 1 (Step 2);

solution heat treating and cooling the forged ingot in Step 2 (Step 3);

hot processing by extruding the cooled ingot in Step 3 (Step 4);

initially heat treating the extruded shell in Step 4 (Step 5);

cold processing the heat treated and extruded shell in Step 5, in which, the zirconium alloy nuclear fuel cladding is prepared by conducting intermediate heat treating in the middle of the cold processing (Step 6); and finally heat treating the thus prepared zirconium alloy nuclear fuel cladding to prepare a nuclear fuel cladding (Step 7).

Through manufacturing a nuclear fuel cladding by using a zirconium alloy for a nuclear fuel cladding having a good oxidation resistance under a severe reactor operation condition according to the present invention, a good oxidation resistance of the nuclear fuel cladding may be confirmed in an accident condition as well as a normal operation condition of a reactor, and a nuclear fuel cladding having a power uprate, a load follow, an ultra high burnup and an ultra long cycle operation may be manufactured, thereby both economic efficiency and safety being improved at the same time.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
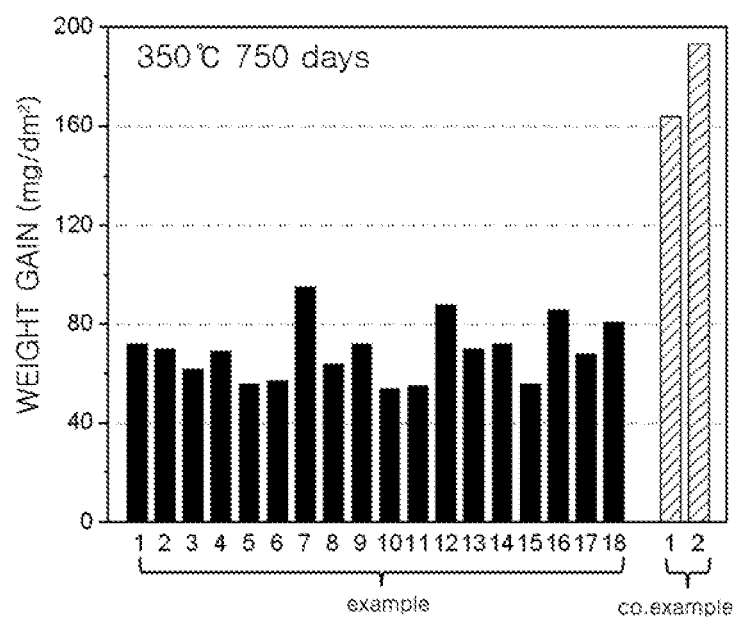
FIG. 1 is a graph illustrating evaluation results on an oxidation resistance under a normal operating condition with respect to a nuclear fuel cladding prepared in Examples 1 to 18 and Comparative Examples 1 and 2.

Features and advantages of the present invention will be more clearly understood by the following detailed description of the present preferred embodiments by reference to the accompanying drawings. It is first noted that terms or words used herein should be construed as meanings or concepts corresponding with the technical spirit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

Hereinafter, the present invention will be described in detail.

The present invention provides a zirconium alloy for a nuclear fuel cladding including 1.8 to 2.0 wt % of niobium (Nb); at least one element selected from the group consisting of iron (Fe), chromium (Cr) and copper (Cu); 0.1 to 0.15 wt % of oxygen (O); 0.008 to 0.012 wt % of silicon (Si) and a remaining amount of zirconium (Zr), in which, an amount of the iron (Fe) is 0.1 to 0.4 wt %, an amount of the chromium (Cr) is 0.05 to 0.2 wt %, and an amount of the copper (Cu) is 0.03 to 0.2 wt %.

The zirconium alloy for the nuclear fuel cladding according to the present invention may further include 0.01 to 0.1 wt % of the tin (Sn).

Since the oxidation resistance of the nuclear fuel cladding may be determined by the kind and components of the elements constituting the zirconium alloy, the properties and the limiting reasons of the constituting ratios of each constituting element of the zirconium alloy for the nuclear fuel cladding in accordance with the present invention will be described in detail, below.

(1) Niobium (Nb)

Niobium is known as a main contributing element to the increase of the corrosion resistance of a zirconium alloy. Various kinds of niobium containing zirconium alloy nuclear fuel claddings already have been developed and used as a nuclear fuel cladding in practice in a nuclear power plant. The reason on the increase of the corrosion resistance of the zirconium alloy through the addition of the niobium has not been clearly identified but may be explained by several reasons. Above all, a β-niobium precipitate is considered to be the most contributing factor to the increase of the corrosion resistance, and the corrosion resistance is found to be increased even more when the size of the β-niobium precipitate decreases. Since the corrosion resistance of the zirconium alloy is influenced by the property of the oxide layer formed on the surface of the zirconium alloy, the corrosion resistance may be improved when the protective property of the oxide layer with respect to oxygen diffusion is maintained for a long time. From this point of view, fine and uniformly dispersed precipitate is very advantageous in manufacturing the internal stress of the oxide layer uniformly and in increasing the corrosion resistance because the protective property of the oxide layer may be maintained for a longer time even when the precipitate is included in the oxide layer through a corrosion process. In order to achieve the effects, the amount of the niobium in the zirconium alloy for the nuclear fuel cladding according to the present invention is limited to 1.8 to 2.0 wt %.

(2) Tin (Sn)

Tin (Sn) contributes to the increase of the mechanical strength by a solution strengthening, however, reduces a corrosion resistance. Since the size of the crystal grain of an oxide layer is known to be decreased by the addition of the tin to facilitate the diffusion of oxygen ions, the decrease of the addition amount of the tin may be advantageous to improve the protecting property of the oxide layer. However, the zirconium alloy excluding the tin may be rapidly corroded in a corrosive environment including a high concentration of LiOH. Accordingly, in the zirconium alloy for the nuclear fuel cladding according to the present invention, the amount of the tin may be limited in a range of 0.01 to 0.1 wt % in order to minimize the decrease of the corrosion resistance due to the addition of the tin.

(3) Iron (Fe), Chromium (Cr) and Copper (Cu) (Transition Metal Elements)

The transition metal such as iron, chromium and copper may make the direction of the crystal growth of the zirconium oxide layer irregularly, and prevent the growth of the oxide layer only in one direction. Thus, the sudden breakage of the oxide layer may be prevented. In addition, the deforming property of the oxide layer is known to be increased due to the addition of the transition metal. However, when the amount added of the transition metal is exceedingly large, the machinability while manufacturing the nuclear fuel cladding may be deteriorated. Accordingly, the amount added of the transition metal in the zirconium alloy for the nuclear fuel cladding in the present invention may be limited to 0.1 to 0.4 wt % for the iron, 0.05 to 0.2 wt % for the chromium, and 0.03 to 0.2 wt % for the copper.

(4) Silicon (Si) and Oxygen (O)

Oxygen contributes to the improvement of the mechanical strength of the zirconium alloy through a solution strengthening, and silicon may reduce hydrogen absorptiveness in a zirconium base and may delay the transition phenomenon of rapidly increasing a corrosion amount with time. Accordingly, the amount of trace elements added in the zirconium alloy for the nuclear fuel cladding according to the present invention may be limited to 0.1 to 0.15 wt % for the oxygen and 0.008 to 0.012 wt % for the silicon. When the amount added of the oxygen gets out of the limited range, the corrosion resistance may be decreased and the machinability may be deteriorated. When the amount added of the silicon gets out of the limited range, the corrosion resistance may be decreased.

In addition, a zirconium alloy nuclear fuel cladding prepared by using the zirconium alloy for the nuclear fuel cladding may be provided in the present invention.

In addition, a method of preparing the zirconium alloy nuclear fuel cladding by using the zirconium alloy for the nuclear fuel cladding may be provided in the present invention.

The method of preparing the zirconium alloy nuclear fuel cladding according to the present invention includes:

manufacturing an ingot by vacuum arc remelting and then cooling the zirconium alloy for the nuclear fuel cladding (Step 1);

forging thus manufactured ingot in Step 1 (Step 2);

solution heat treating and cooling the forged ingot in Step 2 (Step 3);

hot processing by extruding the cooled ingot in Step 3 (Step 4);

initially heat treating the extruded shell in Step 4 (Step 5);

cold processing the heat treated and extruded shell in Step 5, in which, the zirconium alloy nuclear fuel cladding is prepared by conducting intermediate heat treating in the middle of the cold processing (Step 6); and finally heat treating the thus prepared zirconium alloy nuclear fuel cladding to prepare a nuclear fuel cladding (Step 7).

Hereinafter, the method of preparation according to the present invention will be described in detail step by step.

In the method of preparing the zirconium alloy nuclear fuel cladding according to the present invention, Step 1 corresponds to the step of manufacturing an ingot by vacuum arc remelting (VAR) the zirconium alloy for the nuclear fuel cladding, and then cooling.

The ingot may be desirably manufactured by a VAR method. Particularly, the ingot may be manufactured by melting the zirconium alloy by maintaining a vacuum state of about $1 \times 10^{-5}$ torr in a chamber, injecting an argon (Ar) gas to 0.1 to 0.3 torr, and applying a current of 500 to 1,000 A, and then cooling. In this case, the melting of the zirconium alloy for the nuclear fuel cladding may be repeated for 3 to 6 times to prevent the segregation of impurities or the non-uniform dispersion of alloy components in the ingot. In addition, an inert gas such as the argon gas may be injected during the cooling process to prevent the oxidation of the sample at the surface portion during the cooling.

Step 2 in the method of preparing the zirconium alloy nuclear fuel cladding according to the present invention corresponds to the step of forging thus manufactured ingot in Step 1 in a β-phase region. In Step 2, the forging of the ingot is conducted in the β-phase region at 1,000° C. to 1,200° C. to break the cast structure in the thus manufactured ingot in Step 1. When the temperature for conducting the forging is lower than 1,000° C., the cast structure may not be easily broken, and when the temperature for conducting the forging is higher than 1,200° C., the cost for the heat treatment may be increased.

Step 3 in the method of preparing the zirconium alloy nuclear fuel cladding according to the present invention corresponds to a β-quenching step including solution heat treating the forged ingot in Step 2 in the β-phase region and rapid cooling. In Step 3, the ingot may be solution heat treated and cooled in the β-phase region to homogenize the alloy components in the ingot and to obtain fine precipitation. In this case, the solution heat treating may be preferably conducted at 1,000° C. to 1,200° C. and more preferably conducted at 1,050° C. to 1,100° C. In addition, the solution heat treating may be preferably conducted for 10 to 40 minutes, and more preferably conducted for 20 to 30 minutes. After the solution heat treating, the cooling may be conducted to a temperature range of 300° C. to 400° C. by using water at a cooling rate of 300 to 400° C./s in a β-phase region.

Step 4 in the method of preparing the zirconium alloy nuclear fuel cladding according to the present invention corresponds to the step of hot processing by extruding the cooled ingot in Step 3. The cooled ingot in Step 3 is processed to a hollow billet and then hot extruded to produce an extruded shell suitable for a cool processing. In this case, the temperature for conducting the extrusion may be preferably in a range of 600° C. to 640° C., and may be more preferably in a range of 625° C. to 635° C. When the temperature gets out of the range, the extruded shell suitable for processing in Step 5 may not be obtainable.

Step 5 in the method of preparing the zirconium alloy nuclear fuel cladding according to the present invention corresponds to the step of initially heat treating the extruded shell in Step 4. In this case, the heat treating in Step 5 of the extruded shell obtained in Step 4 may be preferably conducted at 570° C. to 610° C. for 2 to 4 hours, and may be more preferably conducted at 575° C. to 585° C. for 2.5 to 3.5 hours.

In the method of preparing the zirconium alloy nuclear fuel cladding according to the present invention, Step 6 corresponds to the step of cold processing the heat treated and extruded shell in Step 5, and conducting an intermediate heat treating to prepare the zirconium alloy nuclear fuel cladding. The cold processing and the intermediate heat treating may be repeatedly conducted to prepare the zirconium alloy nuclear fuel cladding. The cold processing and the intermediate heat treating in Step 6 may be conducted by performing 2 to 5 times of the cold processing of the heat treated and extruded shell in Step 5 and performing 1 to 4 times of the intermediate heat treating in the middle of the cold processing. In this case, the intermediate heat treating may be preferably conducted at 570° C. to 610° C. for 3 to 10 hours. Through repeating the cold processing and the intermediate heat treating, recrystallized structure may be formed in the nuclear fuel cladding, β-niobium precipitate may be finely and uniformly distributed, and the concentration of niobium in the base may become an equilibrium concentration.

In the method of preparing the zirconium alloy nuclear fuel cladding according to the present invention, Step 7 corresponds to the step of finally heat treating thus prepared zirconium alloy nuclear fuel cladding obtained in Step 6. In this case, the final heat treating in Step 7 may be preferably conducted in vacuum, at 470° C. to 580° C. for 1 to 100 hours. Through the final heat treating, the concentration of the niobium in the α-zirconium base metal of the zirconium alloy nuclear fuel cladding may become low, and a precipitate including a β-niobium precipitate may be produced. The zirconium alloy including the β-niobium precipitate may require a heat treatment for a long time until the concentration of the niobium in the α-zirconium base metal become an equilibrium concentration by the final heat treatment. However, in this case, the size of the precipitate may increase to deteriorate the corrosion resistance. Thus, the mean particle size of the β-niobium precipitate may be controlled to 70 nm or less.

The zirconium alloy nuclear fuel cladding prepared by the method of the present invention may be used as the nuclear fuel cladding in a nuclear reactor of a light-water nuclear power plant and a heavy-water nuclear power plant, and may have an excellent oxidation resistance under an emergency condition of accident as well as a normal operating condition of the reactor. Thus, the economic efficiency and the safety of the nuclear fuel may be improved at the same time.

Hereinafter, the present invention will be described in more detail with reference to the following examples and experimental examples. However, the following examples and experimental examples are provided for illustrative purposes only, and the scope of the present invention should not be limited thereto in any manner.

Example 1

Preparation of Zirconium Alloy Nuclear Fuel Cladding 1

(1) Ingot Manufacturing Step (Step 1)

A zirconium alloy including 1.8 wt % of niobium, 0.1 wt % of iron, 0.12 wt % of oxygen, 0.01 wt % of silicon and the remaining amount of zirconium was manufactured into an ingot by a VAR method. The zirconium used was sponge zirconium of nuclear grade designated in ASTM B349, and the alloying elements used were high purity elements of 99.99% or more. In this case, the silicon and the oxygen were melted first with zirconium to prepare a mother alloy, and then, the remaining components were added by the given amount while melting the ingot. In order to prevent the segregation of impurities and the non-uniform distribution of the alloy components, the melting process was repeated for four times. In order to prevent an oxidation during the melting, the ingot was manufactured in a water-cooling copper crucible having a diameter of 60 mm with the cooling water pressure of 1 kgf/cm$^2$, by maintaining a sufficient vacuum state of a chamber to $1 \times 10^{-5}$ torr, then, injecting a high purity argon gas (99.99%) and applying a current of 500 A.

(2) Ingot Forging Step in β-Phase Region (Step 2)

In order to break the cast structure in the ingot manufactured in Step 1, a forging was conducted at 1,100° C. in a β-phase region.

(3) β-Quenching Step (Step 3)

In order to uniformly distribute the alloy components in the ingot, the ingot manufactured in Step 2 was solution heat treated at 1,050° C., a β-phase temperature, for 20 minutes. After completing the solution heat treatment, the ingot was dropped in a water bath filled up with water at room temperature to rapidly cooling the ingot to a temperature of 400° C. or less at a cooling rate of 300° C./s or more, thereby producing a martensite structure or a widmanstatten structure. Then, the product was dried at 150° C. for 24 hours to remove the remaining water on the surface of material.

(4) Hot Processing Step (Step 4)

The β-quenched material at Step 3 was processed into a hollow billet, and then was hot extruded at 630° C. to produce an extruded shell suitable for a cold processing.

(5) First Heat Treating Step (Step 5)

The hot extruded shell in step 4 was first heat treated at 580° C. for 3 hours.

(6) Cold Processing and Intermediate Heat Treating Step (Step 6)

The first heat treated and extruded shell in step 5 was cold processed and intermediate heat treated at 580° C. for 2 hours in a vacuum atmosphere. The heat treated and extruded shell was second cold processed and intermediate heat treated at 580° C. for 2 hours in a vacuum atmosphere. The heat treated and extruded shell was third cold processed and intermediate heat treated at 580° C. for 2 hours in a vacuum atmosphere. The extruded shell was final cold processed to produce a nuclear fuel cladding having an outer diameter of 9.5 mm and a thickness of 0.57 mm.

(7) Final Heat Treating Step (Step 7)

The processed nuclear fuel cladding in step 6 was finally heat treated at 470° C. to 580° C. for 10 hours in a vacuum atmosphere to produce a zirconium alloy nuclear fuel cladding.

Example 2

Preparation of Zirconium Alloy Nuclear Fuel Cladding 2

A zirconium alloy nuclear fuel cladding was prepared by conducting the same procedure as described in Example 1 except for using 1.8 wt % of niobium, 0.2 wt % of iron, 0.12 wt % of oxygen, 0.01 wt % of silicon and the remaining amount of zirconium as the zirconium alloy components.

Example 3

Preparation of Zirconium Alloy Nuclear Fuel Cladding 3

A zirconium alloy nuclear fuel cladding was prepared by conducting the same procedure as described in Example 1 except for using 2.0 wt % of niobium, 0.1 wt % of iron, 0.12 wt % of oxygen, 0.01 wt % of silicon and the remaining amount of zirconium as the zirconium alloy components.

Example 4

Preparation of Zirconium Alloy Nuclear Fuel Cladding 4

A zirconium alloy nuclear fuel cladding was prepared by conducting the same procedure as described in Example 1 except for using 2.0 wt % of niobium, 0.1 wt % of chromium, 0.12 wt % of oxygen, 0.01 wt % of silicon and the remaining amount of zirconium as the zirconium alloy components.

Example 5

Preparation of Zirconium Alloy Nuclear Fuel Cladding 5

A zirconium alloy nuclear fuel cladding was prepared by conducting the same procedure as described in Example 1 except for using 1.8 wt % of niobium, 0.03 wt % of copper, 0.12 wt % of oxygen, 0.01 wt % of silicon and the remaining amount of zirconium as the zirconium alloy components.

Example 6

Preparation of Zirconium Alloy Nuclear Fuel Cladding 6

A zirconium alloy nuclear fuel cladding was prepared by conducting the same procedure as described in Example 1 except for using 1.8 wt % of niobium, 0.2 wt % of copper, 0.12 wt % of oxygen, 0.01 wt % of silicon and the remaining amount of zirconium as the zirconium alloy components.

Example 7

Preparation of Zirconium Alloy Nuclear Fuel Cladding 7

A zirconium alloy nuclear fuel cladding was prepared by conducting the same procedure as described in Example 1 except for using 1.8 wt % of niobium, 0.4 wt % of iron, 0.2 wt % of chromium, 0.12 wt % of oxygen, 0.01 wt % of silicon and the remaining amount of zirconium as the zirconium alloy components.

Example 8

Preparation of Zirconium Alloy Nuclear Fuel Cladding 8

A zirconium alloy nuclear fuel cladding was prepared by conducting the same procedure as described in Example 1 except for using 1.8 wt % of niobium, 0.1 wt % of iron, 0.03 wt % of copper, 0.12 wt % of oxygen, 0.01 wt % of silicon and the remaining amount of zirconium as the zirconium alloy components.

Example 9

Preparation of Zirconium Alloy Nuclear Fuel Cladding 9

A zirconium alloy nuclear fuel cladding was prepared by conducting the same procedure as described in Example 1 except for using 1.8 wt % of niobium, 0.1 wt % of iron, 0.1 wt % of copper, 0.12 wt % of oxygen, 0.01 wt % of silicon and the remaining amount of zirconium as the zirconium alloy components.

Example 10

Preparation of Zirconium Alloy Nuclear Fuel Cladding 10

A zirconium alloy nuclear fuel cladding was prepared by conducting the same procedure as described in Example 1 except for using 1.8 wt % of niobium, 0.05 wt % of chromium, 0.05 wt % of copper, 0.12 wt % of oxygen, 0.01 wt % of silicon and the remaining amount of zirconium as the zirconium alloy components.

Example 11

Preparation of Zirconium Alloy Nuclear Fuel Cladding 11

A zirconium alloy nuclear fuel cladding was prepared by conducting the same procedure as described in Example 1 except for using 1.8 wt % of niobium, 0.05 wt % of chromium, 0.1 wt % of copper, 0.12 wt % of oxygen, 0.01 wt % of silicon and the remaining amount of zirconium as the zirconium alloy components.

Example 12

Preparation of Zirconium Alloy Nuclear Fuel Cladding 12

A zirconium alloy nuclear fuel cladding was prepared by conducting the same procedure as described in Example 1 except for using 1.8 wt % of niobium, 0.4 wt % of iron, 0.2 wt % of chromium, 0.1 wt % of copper, 0.12 wt % of oxygen, 0.01 wt % of silicon and the remaining amount of zirconium as the zirconium alloy components.

Example 13

Preparation of Zirconium Alloy Nuclear Fuel Cladding 13

A zirconium alloy nuclear fuel cladding was prepared by conducting the same procedure as described in Example 1 except for using 2.0 wt % of niobium, 0.1 wt % of tin, 0.12 wt % of oxygen, 0.01 wt % of silicon and the remaining amount of zirconium as the zirconium alloy components.

Example 14

Preparation of Zirconium Alloy Nuclear Fuel Cladding 14

A zirconium alloy nuclear fuel cladding was prepared by conducting the same procedure as described in Example 1 except for using 2.0 wt % of niobium, 0.1 wt % of tin, 0.1 wt % of iron, 0.12 wt % of oxygen, 0.01 wt % of silicon and the remaining amount of zirconium as the zirconium alloy components.

Example 15

Preparation of Zirconium Alloy Nuclear Fuel Cladding 15

A zirconium alloy nuclear fuel cladding was prepared by conducting the same procedure as described in Example 1 except for using 2.0 wt % of niobium, 0.1 wt % of tin, 0.05 wt % of copper, 0.12 wt % of oxygen, 0.01 wt % of silicon and the remaining amount of zirconium as the zirconium alloy components.

Example 16

Preparation of Zirconium Alloy Nuclear Fuel Cladding 16

A zirconium alloy nuclear fuel cladding was prepared by conducting the same procedure as described in Example 1 except for using 1.8 wt % of niobium, 0.1 wt % of tin, 0.4 wt % of iron, 0.2 wt % of chromium, 0.12 wt % of oxygen, 0.01 wt % of silicon and the remaining amount of zirconium as the zirconium alloy components.

Example 17

Preparation of Zirconium Alloy Nuclear Fuel Cladding 17

A zirconium alloy nuclear fuel cladding was prepared by conducting the same procedure as described in Example 1 except for using 1.8 wt % of niobium, 0.1 wt % of tin, 0.05 wt % of chromium, 0.05 wt % of copper, 0.12 wt % of oxygen, 0.01 wt % of silicon and the remaining amount of zirconium as the zirconium alloy components.

Example 18

Preparation of Zirconium Alloy Nuclear Fuel Cladding 18

A zirconium alloy nuclear fuel cladding was prepared by conducting the same procedure as described in Example 1 except for using 1.8 wt % of niobium, 0.1 wt % of tin, 0.4 wt % of iron, 0.2 wt % of chromium, 0.1 wt % of copper, 0.12 wt % of oxygen, 0.01 wt % of silicon and the remaining amount of zirconium as the zirconium alloy components.

Comparative Example 1

A zirconium alloy nuclear fuel cladding was prepared by conducting the same procedure as described in Example 1 except for using 1.0 wt % of niobium, 1.0 wt % of tin, 0.1 wt % of iron, 0.12 wt % of oxygen, 0.01 wt % of silicon and the remaining amount of zirconium as the zirconium alloy components.

Comparative Example 2

A zirconium alloy nuclear fuel cladding was prepared by conducting the same procedure as described in Example 1 except for using 1.3 wt % of tin, 0.2 wt % of iron, 0.1 wt % of chromium, 0.12 wt % of oxygen, 0.01 wt % of silicon and the remaining amount of zirconium as the zirconium alloy components.

The components of the zirconium alloy used in Examples 1 to 18 and Comparative Examples 1 and 2 are summarized in the following Table 1.

TABLE 1

| | Niobium (wt %) | Tin (wt %) | Iron (wt %) | Chromium (wt %) | Copper (wt %) | Oxygen (wt %) | Silicon (wt %) | Zirconium |
|---|---|---|---|---|---|---|---|---|
| Example 1 | 1.8 | — | 0.1 | — | — | 0.12 | 0.01 | Residual amount |
| Example 2 | 1.8 | — | 0.2 | — | — | 0.12 | 0.01 | Residual amount |
| Example 3 | 2.0 | — | 0.1 | — | — | 0.12 | 0.01 | Residual amount |
| Example 4 | 2.0 | — | — | 0.1 | — | 0.12 | 0.01 | Residual amount |
| Example 5 | 1.8 | — | — | — | 0.03 | 0.12 | 0.01 | Residual amount |
| Example 6 | 1.8 | — | — | — | 0.2 | 0.12 | 0.01 | Residual amount |
| Example 7 | 1.8 | — | 0.4 | 0.2 | — | 0.12 | 0.01 | Residual amount |
| Example 8 | 1.8 | — | 0.1 | — | 0.03 | 0.12 | 0.01 | Residual amount |
| Example 9 | 1.8 | — | 0.1 | — | 0.1 | 0.12 | 0.01 | Residual amount |
| Example 10 | 1.8 | — | — | 0.05 | 0.05 | 0.12 | 0.01 | Residual amount |
| Example 11 | 1.8 | — | — | 0.05 | 0.1 | 0.12 | 0.01 | Residual amount |
| Example 12 | 1.8 | — | 0.4 | 0.2 | 0.1 | 0.12 | 0.01 | Residual amount |
| Example 13 | 2.0 | 0.1 | — | — | — | 0.12 | 0.01 | Residual amount |
| Example 14 | 2.0 | 0.1 | 0.1 | — | — | 0.12 | 0.01 | Residual amount |
| Example 15 | 2.0 | 0.1 | — | — | 0.05 | 0.12 | 0.01 | Residual amount |
| Example 16 | 1.8 | 0.1 | 0.4 | 0.2 | — | 0.12 | 0.01 | Residual amount |
| Example 17 | 1.8 | 0.1 | — | 0.05 | 0.05 | 0.12 | 0.01 | Residual amount |
| Example 18 | 1.8 | 0.1 | 0.4 | 0.2 | 0.1 | 0.12 | 0.01 | Residual amount |
| Comparative Example 1 | 1.0 | 1.0 | 0.1 | — | — | 0.12 | 0.01 | Residual amount |
| Comparative Example 2 | — | 1.3 | 0.2 | 0.1 | — | 0.12 | 0.01 | Residual amount |

Experiment 1

Evaluation on Oxidation Resistance Under Normal Operating Condition of Reactor

To evaluate the oxidation resistance of the nuclear fuel claddings prepared in Examples 1 to 18 according to the present invention and the nuclear fuel claddings prepared in Comparative Examples 1 and 2 at a normal operating condition, the following corrosion test was conducted.

Corrosion samples of 50 mm length were prepared for the nuclear fuel claddings prepared in Examples 1 to 18 and the nuclear fuel claddings prepared in Comparative Examples 1 and 2. The prepared corrosion samples were pickled using a solution including water:nitric acid:hydrofluoric acid by the volume ratio of 50:40:10 to remove impurities and defects on the surface of the samples. The surface area and the initial weight of the pickled samples were measured, and the corrosion samples were inserted into a corrosion test apparatus, which is a simulator of a nuclear reactor of 360° C. (18.9 MPa) water condition. While conducting the corrosion test, the corrosion samples were periodically taken out and weighed. The corrosion degree of the samples was calculated by the weight increment with respect to the surface area and evaluated quantitatively. The results on the corrosion test are illustrated in FIG. 1.

As illustrated in FIG. 1, after conducting the corrosion test for 750 days, the weight increment of the nuclear fuel claddings prepared by Examples 1 to 18 according to the present invention was confirmed to be very low when comparing with the weight increment of the nuclear fuel claddings prepared by Comparative Examples 1 and 2.

Experiment 2

Evaluation on Oxidation Resistance Under Accident Condition of Reactor

To evaluate the oxidation resistance of the nuclear fuel claddings prepared in Examples 2, 3, 4, 5, 6, 8, 9, 13 and 15 and Comparative Example 2 under an accident condition of a reactor, the following corrosion test was conducted.

Oxidation samples of 10 mm length were prepared for the nuclear fuel claddings prepared in Examples 2, 3, 4, 5, 6, 8, 9, 13 and 15 and Comparative Example 2. The prepared oxidation samples were pickled using a solution including water:nitric acid:hydrofluoric acid by the volume ratio of 50:40:10 to remove impurities and defects on the surface of the samples. The surface area and the initial weight of the pickled oxidation samples were measured, and an oxidation test at a high temperature was conducted at 1,200° C. for 1 hour. The oxidation degree of the oxidation samples was calculated by the weight increment with respect to the surface area and evaluated quantitatively. The results on the oxidation test at a high temperature are illustrated in FIG. 2.

Figure 2:
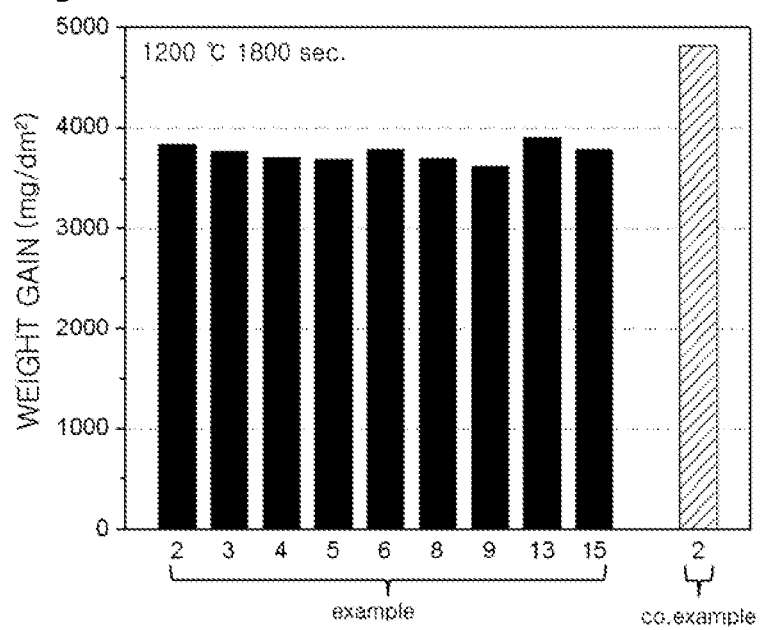
FIG. 2 is a graph illustrating evaluation results on an oxidation resistance under an accident condition of a reactor simulator with respect to a nuclear fuel cladding prepared in Examples 2, 3, 4, 5, 6, 8, 9, 13 and 15 and Comparative Example 2.

As illustrated in FIG. 2, after conducting the oxidation test at a high temperature of 1,200° C., the weight increment of the nuclear fuel claddings prepared by Examples 2, 3, 4, 5, 6, 8, 9, 13 and 15 according to the present invention was confirmed to be very low when comparing with the weight increment of the nuclear fuel cladding prepared by Comparative Example 2.

Through the results, a zirconium alloy nuclear fuel cladding having a good oxidation resistance under an accident condition as well as a normal operating condition may be prepared by using a zirconium alloy according to the present invention. The economic efficiency of the nuclear fuel and the safety may be confirmed to increase.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A zirconium alloy for a nuclear fuel cladding consisting of 1.8 wt % of niobium (Nb); 0.05 wt % of chromium (Cr); 0.05 to 0.1 wt % of copper (Cu); 0.1 to 0.15 wt % of oxygen (O); 0.008 to 0.012 wt % of silicon (Si) and a remaining amount of zirconium (Zr).

2. A method of preparing a zirconium alloy nuclear fuel cladding comprising:
   Step 1: manufacturing an ingot by vacuum arc remelting and then cooling the zirconium alloy consisting of 1.8 wt % of niobium (Nb); 0.05 wt % of chromium (Cr); 0.05 to 0.1 wt % of copper (Cu); 0.1 to 0.15 wt % of oxygen (O); 0.008 to 0.012 wt % of silicon (Si) and a remaining amount of zirconium (Zr);
   Step 2: forging thus manufactured ingot in Step 1;
   Step 3: solution heat treating and cooling the forged ingot in Step 2;
   Step 4: hot processing by extruding the cooled ingot in Step 3;
   Step 5: initially heat treating the extruded shell in Step 4;
   Step 6: cold processing the heat treated and extruded shell in Step 5, the zirconium alloy nuclear fuel cladding being prepared by conducting intermediate heat treating in the middle of the cold processing; and
   Step 7: finally heat treating the thus prepared zirconium alloy nuclear fuel cladding to prepare a nuclear fuel cladding.

3. The method of preparing a zirconium alloy nuclear fuel cladding as set forth in claim 2, wherein the forging in Step 2 is conducted at a temperature of 1,000° C. to 1,200° C.

4. The method of preparing a zirconium alloy nuclear fuel cladding as set forth in claim 2, wherein the solution heat treating in Step 3 is conducted at a temperature of 1,000° C. to 1,200° C. for 10 to 40 minutes.

5. The method of preparing a zirconium alloy nuclear fuel cladding as set forth in claim 2, wherein the cooling in Step 3 is conducted to a temperature of 300° C. to 400° C., with a cooling rate of 300 to 400° C./s.

6. The method of preparing a zirconium alloy nuclear fuel cladding as set forth in claim 2, wherein the extrusion in Step 4 is conducted at a temperature of 600 to 640° C.

7. The method of preparing a zirconium alloy nuclear fuel cladding as set forth in claim 2, wherein the heat treating in Step 5 is conducted at a temperature of 570° C. to 610° C. for 2 to 4 hours.

8. The method of preparing a zirconium alloy nuclear fuel cladding as set forth in claim 2, wherein the intermediate heat treating in Step 6 is conducted at a temperature of 570° C. to 610° C. for 3 to 10 hours.

9. The method of preparing a zirconium alloy nuclear fuel cladding as set forth in claim 2, wherein the final heat treatment in Step 7 is conducted at a temperature of 470° C. to 580° C. for 1 to 100 hours.

* * * * *

UNITED STATES PATENT AND TRADEMARK OFFICE
CERTIFICATE OF CORRECTION

Page 1 of 1

PATENT NO.         : 9,111,650 B2
APPLICATION NO.    : 13/747763
DATED              : August 18, 2015
INVENTOR(S)        : Jeong-Yong Park et al.

It is certified that error appears in the above-identified patent and that said Letters Patent is hereby corrected as shown below:

On The Title Page, Item (72) under Inventor: delete "YANG-II" insert -- YANG-IL --.

Signed and Sealed this
Twelfth Day of January, 2016

Michelle K. Lee
*Director of the United States Patent and Trademark Office*